United States Patent
Colburn et al.

(10) Patent No.: US 7,246,835 B1
(45) Date of Patent: Jul. 24, 2007

(54) HEIGHT REDUCTION FOR TACTICAL TRUCK SYSTEM

(75) Inventors: Jeffrey B. Colburn, Harpursville, NY (US); Douglas G. Miller, Vestal, NY (US); Shane F. Mills, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/431,488

(22) Filed: May 10, 2006

(51) Int. Cl.
 *B62D 33/063* (2006.01)
 *B62D 1/18* (2006.01)

(52) U.S. Cl. .............................. 296/26.04; 296/190.04; 280/775

(58) Field of Classification Search ............. 296/26.04, 296/26.05, 26.06, 26.07, 107.03, 146.13, 296/190.01, 190.03, 190.04, 190.05, 190.06, 296/26.01, 26.02, 190.08; 280/775
See application file for complete search history.

(56) References Cited

U.S. PATENT DOCUMENTS

| | | | |
|---|---|---|---|
| 3,000,664 A | 9/1961 | Martin | 296/23 |
| 3,451,713 A * | 6/1969 | Hollingshead | 296/190.03 |
| 3,472,550 A * | 10/1969 | Marco | 296/102 |
| 3,556,549 A * | 1/1971 | Hershman et al. | 280/775 |
| 3,596,416 A | 8/1971 | Hoijka | 52/64 |
| 3,652,119 A | 3/1972 | Hall | 296/23 C |
| 3,675,966 A * | 7/1972 | Luft | 296/190.04 |
| 3,713,688 A * | 1/1973 | Monroe | 296/107.03 |
| 3,912,297 A * | 10/1975 | Mitsuishi et al. | 280/756 |
| 3,941,414 A | 3/1976 | Platt | 296/23 G |
| 4,047,750 A * | 9/1977 | Samide | 296/107.03 |
| 4,089,542 A | 5/1978 | Westerman | 280/639 |
| 4,300,797 A * | 11/1981 | Whitley et al. | 296/164 |
| 4,603,901 A | 8/1986 | McIntosh et al. | 296/165 |
| 5,028,088 A | 7/1991 | Del Monico et al. | 296/27 |
| 5,154,469 A | 10/1992 | Morrow | 296/26 |
| 5,185,973 A | 2/1993 | Oldani | 52/64 |
| 5,282,661 A * | 2/1994 | Arnberger | 296/190.04 |
| 6,135,525 A | 10/2000 | Amann | 296/26.11 |
| 6,712,414 B2 | 3/2004 | Morrow | 296/26.01 |
| 2004/0130136 A1* | 7/2004 | Muller | 280/756 |
| 2005/0087970 A1* | 4/2005 | Ulintz | 280/775 |

FOREIGN PATENT DOCUMENTS

| | | | | |
|---|---|---|---|---|
| FR | 2557040 A1 * | 6/1985 | | 296/100.18 |
| GB | 2133356 A * | 7/1984 | | 296/190.04 |
| JP | 59076337 A * | 5/1984 | | 219/69.15 |
| JP | 61287815 A * | 12/1986 | | 296/190.08 |
| JP | 62221975 A * | 9/1987 | | 296/190.05 |

* cited by examiner

*Primary Examiner*—D. Glenn Dayoan
*Assistant Examiner*—Paul Chenevert
(74) *Attorney, Agent, or Firm*—Burns & Levinson LLP; Jacob N. Erlich; Harvey Kaye

(57) ABSTRACT

A military vehicle configured for transport by cargo aircraft. The vehicle has a cab portion that can be reduced in height by removing and/or collapsing and/or telescoping various components of the cab, such as the doors, roof, roll bar, windshield, and/or steering column.

9 Claims, 3 Drawing Sheets

HEIGHT REDUCTION FOR TACTICAL TRUCK SYSTEM

STATEMENT REGARDING FEDERALLY SPONSORED RESEARCH OR DEVELOPMENT

This invention was made with U.S. Government support and the U.S. Government may have certain rights in the invention.

FIELD OF THE INVENTION

This invention relates generally to tactical wheeled vehicles and, more particularly, to tactical wheeled vehicles which must meet certain height restrictions to fit within an aircraft or other transport vehicle.

BACKGROUND OF THE INVENTION

Tactical wheeled vehicles for military operations are often transported into an operational theater on transport aircraft. The tactical vehicles must be able to fit into the relatively confined space of the cargo holds of these aircraft.

Although some wheeled vehicles are relatively compact and are able to fit into the cargo holds of many different transport aircraft relatively easily, other vehicles (e.g., military ambulances and command/control shelters) are comparably larger due to the functions which these other vehicles serve. The larger sizes of these other vehicles has heretofore dictated that larger transport aircraft be used to transport them into the operational theater. Larger transport aircraft, however, are more expensive to operate and/or may be more limited in terms of where they can land. Therefore, there is a need to be able transport larger tactical vehicles using smaller transport aircraft to do so.

While there are a number of example of trailers or other shelter parts of vehicles which can be reduced in size for transport, such as is used in the recreational vehicle art, such methods and structures can not be easily used for the cab portion of a vehicle whether the cab is separate or an integral part of the vehicle.

U.S. Pat. No. 5,282,661 for a collapsible driver's cab for a truck discloses a vehicle in which the upper parts of the wall panels are connected to the lower parts by hinges and the roof is removable.

SUMMARY OF THE INVENTION

The present invention generally provides various automated (motor, drive gear, worm gear, etc.) and human interface (unpowered mechanical) approaches to collapsing the cab and possibly the shelter of a tactical wheeled vehicle. In this manner, generally larger tactical wheeled vehicles constructed according to the invention can be fit into the cargo holds of smaller aircraft than previously could be accomplished.

In one aspect, the invention features a tactical vehicle in which the height of the vehicle's cab can be reduced. According to this aspect of the invention, the vehicle includes a cab constructed from one or more removable elements and/or one or more collapsible elements. The removable elements may include cab doors and/or the roof of the cab, which can be completely removed from the vehicle cab and stowed elsewhere (e.g., in a cargo bed of the vehicle, if one is provided). The collapsible elements may include elements that fold or elements that telescope down on themselves, e.g., a telescoping roof element (if the roof element is not removable), a telescoping and folding steering column, fold-down seats, fold-down windshield, fold-down roll-bars, etc.

In another aspect, the invention features a method for reducing the height of the cab of a vehicle for stowage in an aircraft cargo hold. According to this aspect of the invention, one or more removable elements are removed from the cab of a tactical vehicle, one or more collapsible elements are collapsed down, and the vehicle is stowed on board the aircraft. Also, the height may be further lowered by removing some of the air from the tires.

There are various types of vehicles to which the present invention may be applied. These include trucks having a cab and an open back or trailer, gun vehicles, ambulances, and troop transports. The construction may include a cab portion and a frame onto which a utility bed can be mounted or an ambulance module which can be exchanged for the utility bed and vice versa. Also, height reduction may be obtained by use of canvas for the roof and at least part of the walls and doors, BIMINI TOP such as a folding or collapsible top for use with boats or motor vehicles constructed of a metal or non-metal rigid frame structure and a canvas, vinyl or textile cover. There may be a structure that allows the whole roof and side walls to slide past each other to be lowered via slide rails once the doors are removed.

The present invention also relates to a process for reducing height such as removing air pressure from the tires. Also, for this particular vehicle, it has the capability to lower its overall ride height to a series of predetermined settings that correspond to mission types such as on-road, off-road, discrete mobility and transportability. It is this transportability mode wherein the vehicle has the capability to "squat" approximately 4 inches to further reduce it's overall height. This is accomplished via an unequal length A-arm suspension system that contains air bag dampers. Once air pressure is released from the airbag, the suspension lowers accordingly.

The present invention together with the above and other advantages may best be understood from the following detailed description of the embodiments of the invention illustrated in the drawings.

DETAILED DESCRIPTION OF EMBODIMENTS OF THE INVENTION

Figure 1:
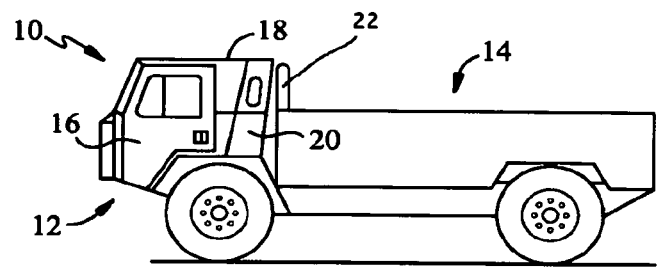
FIGS. 1–3 are schematic, side elevation views of a first embodiment of a tactical wheeled vehicle according to the invention.
Figure 2:
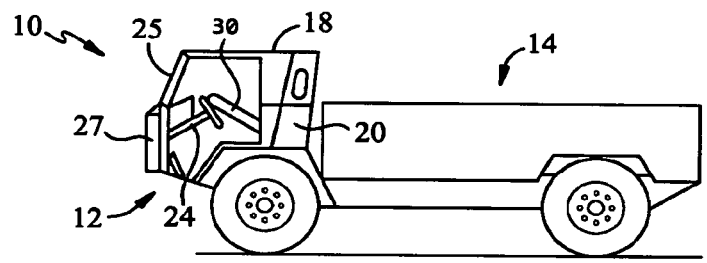
Figure 3:
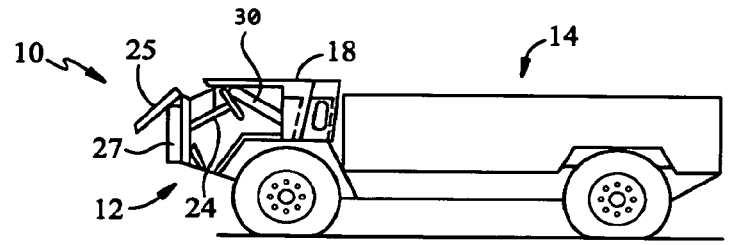

A first embodiment 10 of a tactical wheeled vehicle according to the invention is illustrated in FIGS. 1–3. The vehicle 10 includes a cab portion 12 and a cargo bed portion 14. The cab portion 12 has removable doors 16, which are affixed to the cab portion 12. Additionally, the cab portion 12 has a collapsible, e.g. telescoping, roof portion 18 which is telescopically mounted to lower cab portion 20, a collapsible, e.g. fold-down, roll bar 22, and a collapsible, e.g. telescoping, steering column 24. Windshield 25 is collapsibly, e.g. pivotally, attached to the front wall 27 of the cab portion 12.

Removal of the doors 16 is a manual operation. With respect to the roof portion 18, telescoping of it may be completely manual; power-assisted (e.g., if the telescoping mechanism includes hydraulic cylinders (not illustrated)); or completely self-powered (e.g., if the telescoping mechanism includes electric drive motors and gears (not illustrated) to raise and lower the roof portion 18 relative to the lower cab portion 20. The roll bar 22 is easily released from its operational position by a manual latch mechanism, e.g., of the sort used to release the rear seat on a civilian passenger vehicle and fold it forward. The steering column 24 may be configured to telescope manually or automatically; both manual and powered telescoping steering columns are known, at least within the realm of civilian automobiles. Flip-down windshields are also known, at least within the realm of older civilian vehicles.

As illustrated by the sequence of FIGS. 1–3, the vehicle 10 is loaded onto a cargo aircraft (not illustrated) as follows. First, the doors 16 are removed from the cab portion 12 and may be stowed in the vehicle's cargo bed portion 14 or elsewhere. Roll bar 22 is folded forward, e.g., by manually releasing its latch mechanism and pivoting it forward, and the seats 30 are also folded forward. Steering column 24 is collapsed downwardly as well. Windshield 25 is released, e.g., by releasing associated latches (not illustrated) and collapsed (folded) down toward the front wall 27 of the cab portion 16. Roof portion 18 is collapsed (slid) down relative to lower cab portion 20 into its retracted position (FIG. 3). The vehicle may then be winched or driven aboard the aircraft and secured in an appropriate manner aboard the aircraft. Tire pressure is reduced via a collapsible tactical inflation system and air-out ride height is obtained.

Figure 3A:
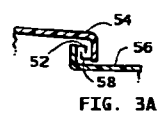
FIG. 3A is a fragmentary view of a rail system for moving parts of the cab.

FIG. 3A shows a detailed cross sectional view of two rails 52 and 58 which slide with respect to each other. Rail 52 is attached to a part 56 of roof portion 18 and rail 58 is attached to a part 54 of lower cab portion 20 to allow the retracting to take place.

Figure 4:
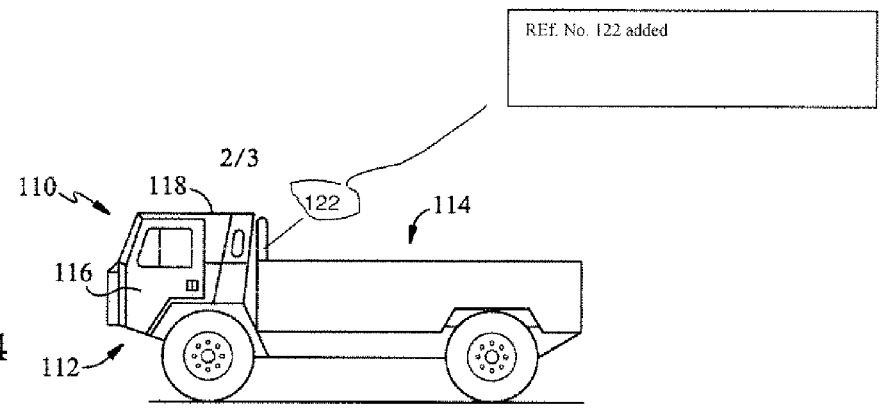
FIGS. 4–6 are schematic, side elevation views of a second embodiment of a tactical wheeled vehicle according to the invention.
Figure 5:
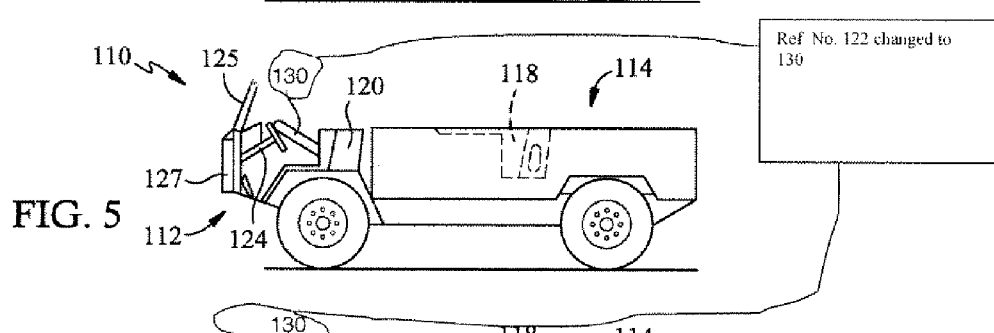
Figure 6:
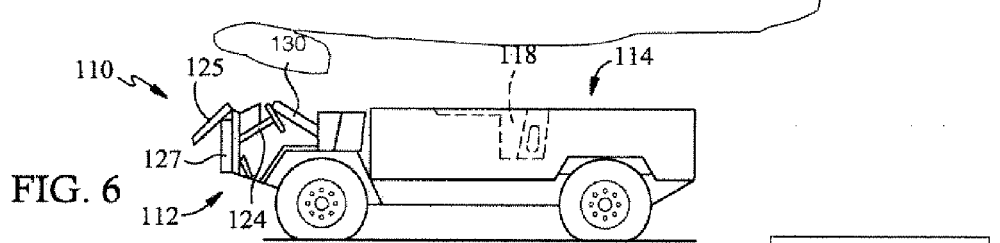

A second embodiment 110 of a tactical wheeled vehicle according to the invention is illustrated in FIGS. 4–6. This embodiment is generally similar to the embodiment 10 illustrated in FIGS. 1–3, except that rather than being telescopically collapsible, the cab roof portion 118 is completely removable from the lower cab portion 120.

As illustrated by the sequence of FIGS. 4–6, the vehicle 110 is loaded onto a cargo aircraft (not illustrated) as follows. The doors 116 are removed from the cab portion 112 and may be stowed in the vehicle's cargo bed portion 114 or elsewhere. Additionally, the cab roof portion 118 is removed from the lower cab portion 120 and may be stowed in the vehicle's cargo bed portion 114, as shown, or elsewhere. Roll bar 122 is folded forward, e.g., by manually releasing its latch mechanism and pivoting it forward, and the seats 130 are also folded forward. Steering column 124 is collapsed downwardly as well. Windshield 125 is released, e.g., by releasing associated latches (not illustrated) and collapsed (folded) down toward the front wall 127 of the cab portion 116. The vehicle may then be winched or driven aboard the aircraft and secured in an appropriate manner aboard the aircraft. Tire pressure is reduced via a collapsible tactical inflation system and air-out ride height is obtained.

Figure 7:
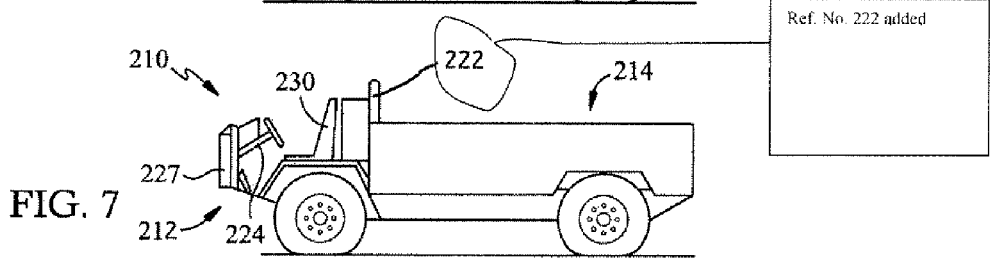
FIG. 7 is a schematic, side elevation views of a third embodiment of a tactical wheeled vehicle according to the invention.

A third embodiment 210 of a tactical wheeled vehicle according to the invention is illustrated in FIG. 7. In this embodiment, the cab portion 212 of the vehicle is open in that it has no roof or doors (and, if desired, no windshield). Accordingly, no doors or roof portions need to be removed for fitment of the vehicle 210 into a cargo aircraft.

As illustrated by FIG. 7, the vehicle 210 is loaded onto a cargo aircraft (not illustrated) as follows. Roll bar 222 is folded forward, e.g., by manually releasing its latch mechanism and pivoting it forward, and the seats 230 are also folded forward. Steering column 224 is collapsed downwardly as well. (If present, the windshield (not illustrated) is released, e.g., by releasing associated latches, and collapsed (folded) down toward the front wall 227 of the cab portion 212.) The vehicle may then be winched or driven aboard the aircraft and secured in an appropriate manner aboard the aircraft. Tire pressure is reduced via a collapsible tactical inflation system and air-out ride height is obtained.

Figure 8:
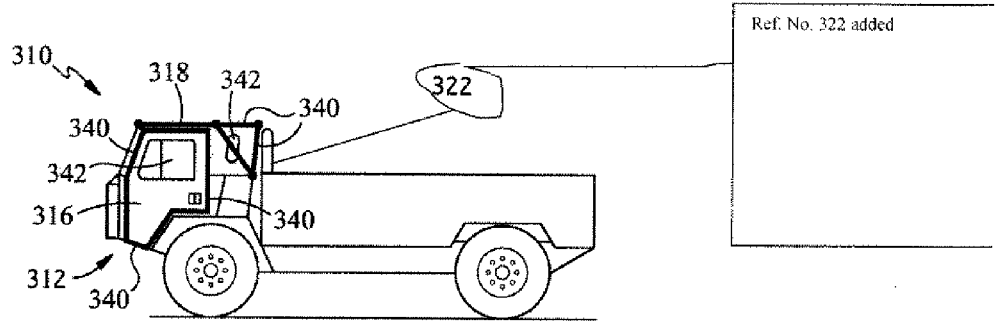
FIGS. 8–10 are schematic, side elevation views of a fourth embodiment of a tactical wheeled vehicle according to the invention.
Figure 9:
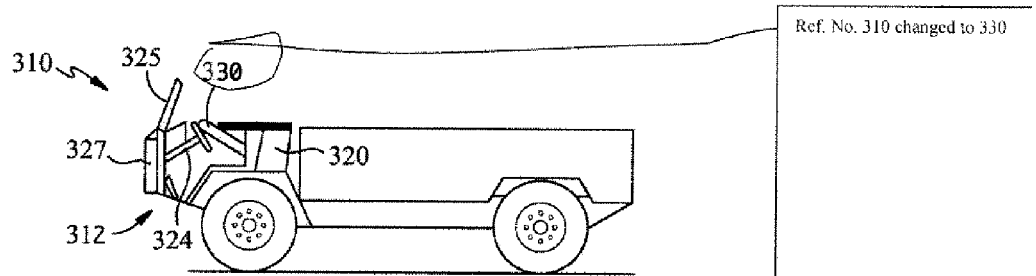
Figure 10:
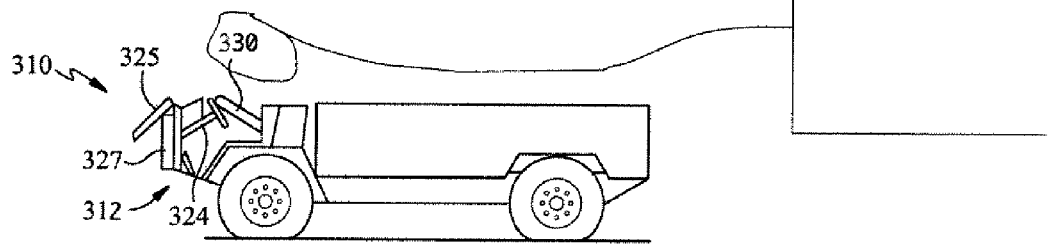

A fourth embodiment 310 of a tactical wheeled vehicle according to the invention is illustrated in FIGS. 8–10. In this embodiment 310, the doors 316 and roof portion 318 are made from fabric such as canvas, which is supported by a collapsible framework 340. If windows are desired, e.g., windows 342, they may be made from clear, flexible material such as vinyl. The collapsible framework is articulated in that it is formed from several smaller segments joined together at pivoting and/or flexible joints. Framework 340 is pivotally attached to the lower cab portion 320 at main attach point, and a system of gears and wires (not illustrated, but within the level of ability of one having skill in the art) is used to raise, retract, and collapse the doors and the roof of the cab in a manner similar to a civilian convertible automobile's roof being folded and stowed.

With this embodiment 310, after the roof and doors are folded down as illustrated in FIG. 9, the rest of the cab is prepared for loading into a cargo aircraft in generally the same manner as described above with respect to the other embodiments. In particular, roll bar 322 is folded forward, e.g., by manually releasing its latch mechanism and pivoting it forward, and the seats 330 are also folded forward. Steering column 324 is collapsed downwardly as well. Windshield 325 is released, e.g., by releasing associated latches (not illustrated) and collapsed (folded) down toward the front wall 327 of the cab portion 312. The vehicle 310 may then be winched or driven aboard the aircraft and secured in an appropriate manner aboard the aircraft. Tire pressure is reduced via a collapsible tactical inflation system, and air-out ride height is obtained.

Thus, the present invention provides for the fitting of tactical wheeled vehicles into confined spaces for air transportability, to allow, for example, ambulance and command/control shelters as well as vehicle cabs to be collapsed to fit within an aircraft for transport. There are various automated and human interface ways of vertically collapsing vehicle cabs and shelters for air transport. The automated ways could include motor, gear drive and worm gear to mention a few. There are simple and complex methods of implementing this depending upon transportability and other requirements.

There are various features that provide for the fitting of tactical wheeled vehicles into confined spaces including doors that fold, canvas doors, canvas tops, vinyl windows, folding roll bars and telescoping parts.

Although the invention has been described with respect to various embodiments, it should be realized that this invention is also capable of a wide variety of further and other embodiments within the spirit and scope of the appended claims.

The invention claimed is:

1. In a vehicle, a cab of the type having at least the following parts, doors, a roof, a roll bar, seats, a steering column, and a windshield, the improvement comprising a door by means of which passengers enter the cab, and wherein a plurality of side walls and the roof are constructed and arranged to slide past each other to be lowered once the doors are removed.

2. In the vehicle of claim 1, wherein one of the parts is a roof portion of said cab.

3. In the vehicle of claim 1, wherein one of the parts is said roll bar.

4. In the vehicle of claim 1, wherein one of the parts is at least one of said seats.

5. In the vehicle of claim 1, wherein one of the parts is said steering column.

6. In the vehicle of claim 1, wherein one of the parts is said windshield.

7. In the vehicle of claim 1 wherein the parts slide past each other by means of slide rails.

8. A method of reducing the height of a vehicle having parts which include doors, a roof, a roll bar, seats, a steering column, and a windshield, which are removable or capable of being telescoped or folded, comprising the steps of:
   providing side walls; and
   the roof and side walls to slide past each other to be lowered.

9. The method of claim 8 further including the step of reducing or removing the air in the tires.

* * * * *